UNITED STATES PATENT OFFICE.

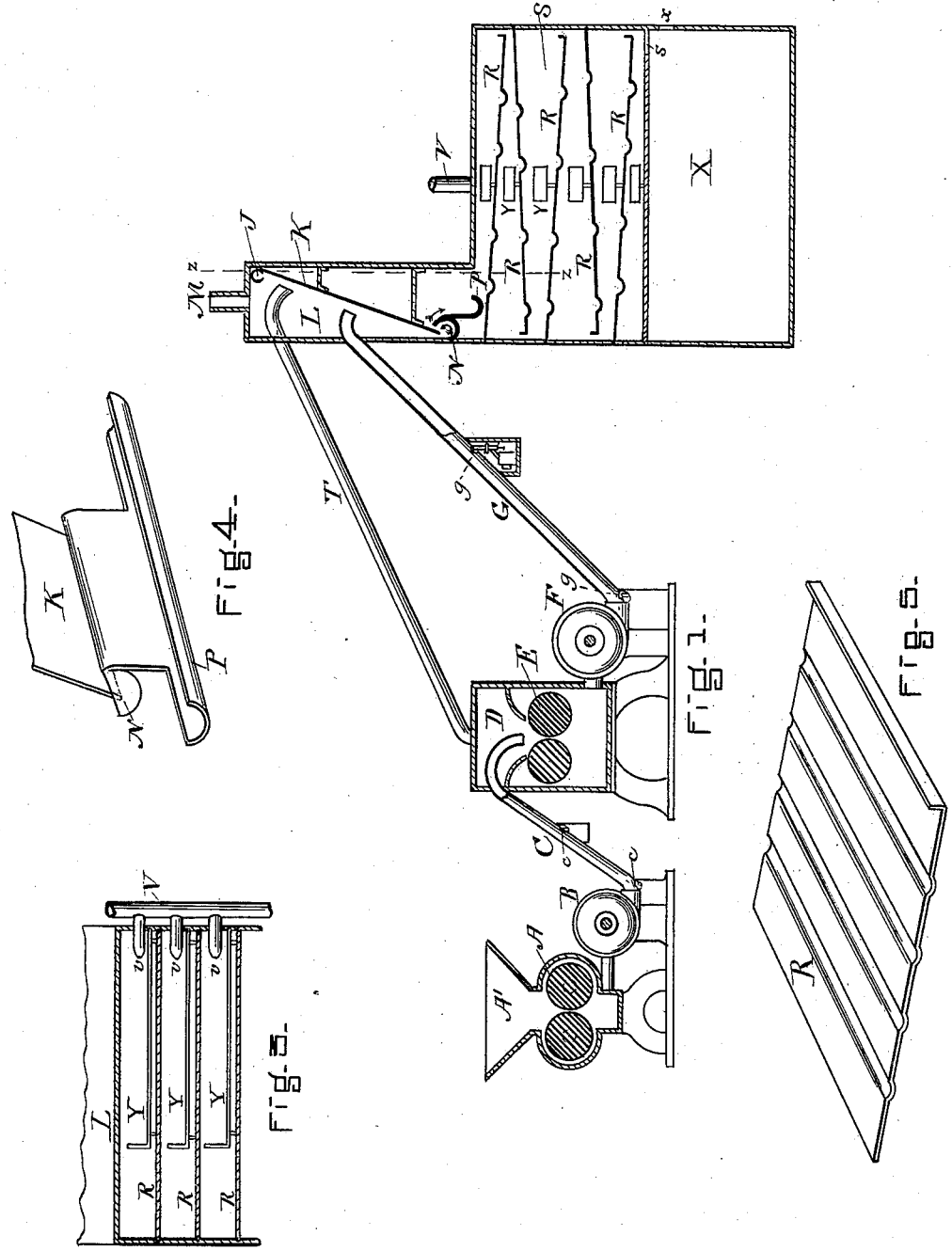

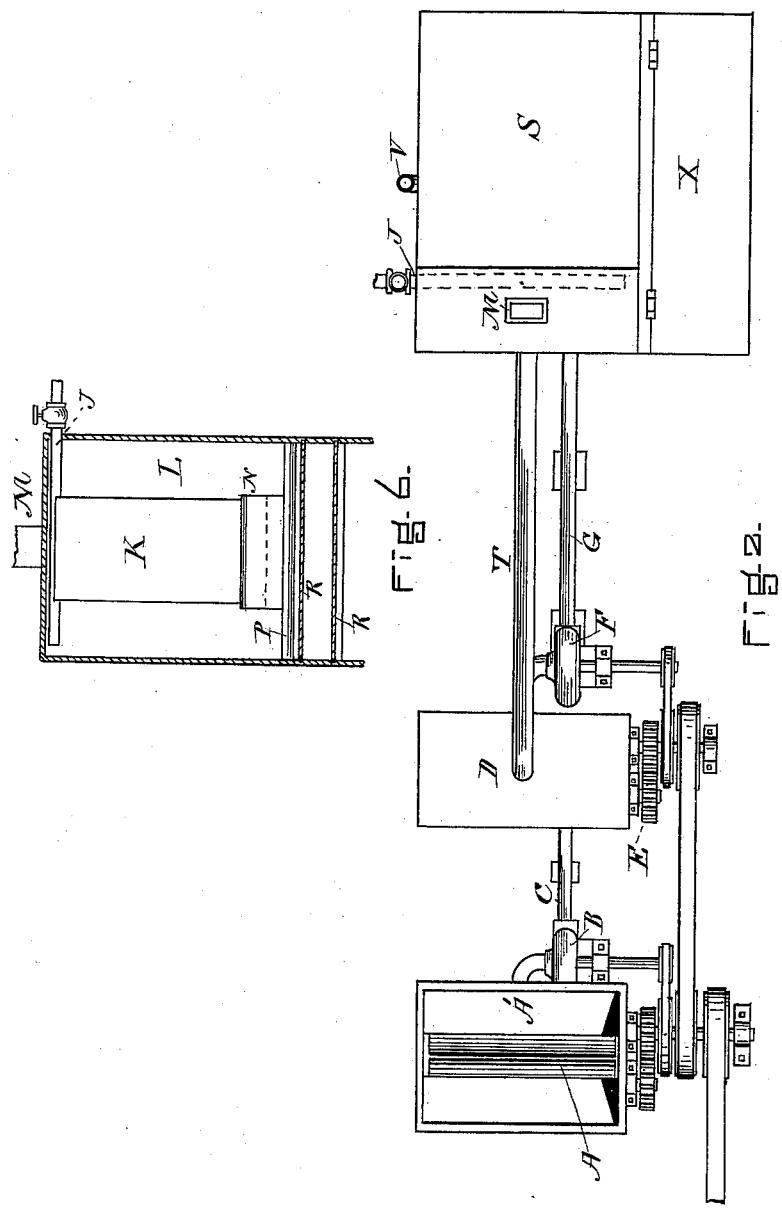

SAMUEL H. COCHRAN, OF EVERETT, MASSACHUSETTS.

ART OF SEPARATING METALS FROM THEIR ORES.

SPECIFICATION forming part of Letters Patent No. 378,868, dated March 6, 1888.

Application filed August 30, 1886. Serial No. 212,275. (No model.)

*To all whom it may concern:*

Be it known that I, SAMUEL H. COCHRAN, of Everett, in the county of Middlesex and State of Massachusetts, have invented a new and useful Improvement in the Art of Separating Metals from their Ores, of which the following is a specification.

My invention relates mainly to the treatment of pulverized ores by the sudden application of heat and cold thereto, so that each particle shall be broken into minute portions for the purpose of burning the refuse and releasing all the metals it contains to be acted upon by amalgamation or in some other way.

My invention consists, generally speaking, in suddenly expanding the gases which each particle of ore may contain and destroying the sulphurets and other like material by passing the cold ore through an intensely-hot flame, keeping it in violent motion while hot, so that it will not stick to the tube or passage through which it is blown; then, if necessary, passing it through one or more pairs of rollers to further pulverize the ore and polish the metal; then passing it again through flame in the same way, and while still hot plunging it into flowing cold water, thereby cracking the larger particles of it and carrying it away to the amalgamating-plates or other place of deposit. To carry out this process there are necessary one or more fans or blowers, a furnace tube or passage connected with each fan, through which the ore may be blown so violently that the ore will not stick to the sides of the passage, one or more furnaces connected with each furnace-tube and throwing into it flames sufficiently hot to insure the expansion of whatever gases the particles of ore passing through the flames may contain and to burn the refuse, and a sheet of cold water into which the product of the flame shall plunge, and by which it shall be carried to the amalgamating-plates or other place of deposit.

My invention also consists in an apparatus especially adapted to carry out this method.

In the drawings, Figure 1 shows in elevation an apparatus of my invention capable of such use, parts being in section to show in a connected way the course of the ore from the mill to the amalgamator or other depository. Fig. 2 shows a plan. Fig. 3 is a detail showing the steam-spreader. Fig. 4 shows the troughs. Fig. 5 shows one of the amalgamating-plates in perspective; and Fig. 6 shows in section on line *z z*, Fig. 1, a portion of the amalgamating-chamber and washing apparatus.

A is a pulverizing-mill of ordinary construction, provided with a suitable hopper, A', into which the ore is fed. B is an exhaust-fan connected with the chamber below the mill into which the ore falls.

C is a tube which connects the fan B with a second chamber, D. Through this tube the pulverized ore which is drawn off from the mill by the fan is conveyed to the chamber B and there fed to the second mill, E. This mill E is best made of one or more pairs of smooth rollers, and its object is to crush the ore rendered brittle by the flame and polish the metal contained in the ore by passing it between the two rollers of each set. The tube may be made of asbestus or any other material capable of standing great heat, and is of proper diameter to convey the dust delivered to it by the exhaust-fan. It must therefore depend for its diameter in any given case upon the capacity of the fan. It is provided with one or more furnaces, from which flames of burning naphtha or other inflammable material are drawn or blown, so as to be almost entirely within it.

The pulverized ore is driven by the fan through the flame, and consequently burned and roasted thoroughly before being subjected to a second crushing at the mill E, being kept in motion, so that it will not stick to the walls of the tube and so clog it. This apparatus differs from anything known to me, in that when in use substantially the entire flame is within the tube, the ore which is to pass through the tube being thus exposed to the greatest heat of the flame instead of to merely the smoke and gases thrown off by the fire.

F is an exhaust-fan which draws pulverized ore from under the mill E, and G is a tube like the tube C, through which the pulverized ore drawn from the mill by the fan is blown into the chamber L. This tube is also provided with one or more furnaces, from which the flames will be blown or drawn, as before described in connection with the tube C.

J is a water-pipe connected with a suitable water-supply and provided with suitable holes, by means of which water is thrown against the plate K, so that the upper surface of the plate K will be covered with a sheet of falling water sufficient to carry off the product thrown against it. This pipe J and plate K are contained in a chamber, L, into which the material is conducted by the tube G, and the plate K is so set in this chamber that the product will be delivered from the mouth of the tube G into the falling sheet of water which covers the plate. The chamber L is provided with a suitable chimney, M, by which the gases induced by the flames and heat will be carried away. N is a trough of peculiar construction for stopping the descent of the water and its contents. The peculiar shape of this trough causes the water and its contents to be mixed together. The trough is in shape three-quarters of a cylinder, and is set so as to throw the water as it descends off the plate K up and over toward the bottom of the plate again, as will be understood from the drawings. The water, as it overflows from this trough N, is caught in a trough, P, which is of the width of the plates R, placed below it, and is intended to feed these plates as the water overflows from it.

The plates R are amalgamating-plates, set one over the other in the box or chamber S, as shown, each plate slanting a little, so as to deliver the water, the refuse, and such gold or other metal as is not amalgamated thereon upon the upper side of the plate below. The plates are supported at the sides or in some other convenient way, so that they can be removed, and so that there will be a space between the lower end of each plate and the wall of the chamber sufficiently wide to allow the fall of water, &c., over the edges upon the plate below. The edges of these plates, if the plates are narrower than the chamber, are turned up to prevent the water, &c., from flowing off at the sides. They are provided with one or more corrugations extending from one side to the other, in which the amalgam will collect as the ore is washed down by the action of the water, the plates being thereby rendered capable of retaining more of the metal than if they were smooth.

V is a pipe for supplying steam to the chamber S. It is provided with nozzles v, by means of which steam can be thrown into the chamber above each plate. It should have a valve by which the amount of steam can be controlled, and also should have a valve by which the water of condensation may be drawn off. In front of each jet or nozzle is a plate, Y, suitably supported, so that the steam which comes from the jet shall be broken up and thoroughly disseminated through the chamber. The pipe V may be connected with the exhaust of a steam-engine, or the boiler, as may be most convenient. The chamber S should be provided with suitable doors, which may be opened to examine the working of the process or to remove the plates for cleaning, when necessary.

Below the chamber S is a tank, X, in which is collected the refuse flowing from the amalgamating-plates. This tank has an overflow, x, from which the water will escape.

My process, when carried out by this apparatus, is as follows: Power being applied to the various mills and fans, as indicated in Fig. 2, the ore is placed in the hopper A', from which it is fed to the mill A. With the ore may be mixed charcoal, salt, or other chemicals useful for the purpose of assisting in the process of obtaining the metal. The addition of charcoal I believe to be very desirable, as it ignites in the flame and causes the ore with which it is mixed to be more thoroughly burned. In this mill the ore is ground as fine as required, and it is then drawn off by means of the exhaust-fan B and blown by it through the tube C. This tube is provided with suitable means to roast the particles of ore in their passage—as, for example, flames of burning naphtha or other inflammable material capable of creating a great heat, these flames being drawn or blown into the tube from its furnaces. Through these flames the pulverized ore (and chemicals, when used) are thrown during their passage to the chamber D, the flame consuming the worthless dust, crackling the particles, and releasing the metal from the minerals which prevent the proper amalgamation of the metal. The larger particles of ore are made brittle by the heat, and are easily acted on by the roller-mill E. The dust, after being acted upon by the mill E, is drawn off by the fan F, which forces it through the tube G, in which it is again roasted, if necessary, by passing through flames, and by which it is conveyed to the chamber L and there received in the sheet of cold water falling over the plate K, the gases given off being carried away by the chimney M. The dust is carried by this sheet of water into the trough N and thoroughly washed, and overflows with the water from it into the trough P, from which it overflows on to the amalgam plates, or into such other depository as may be provided. The trough P being of the width of the amalgam plates allows the water and product from the furnaces as it overflows to be spread over the width of the plates. The steam which is supplied from the pipe V serves to heat the water which contains the treated material and the amalgam plates, and any surplus passes off through the chimney M. The water of condensation in the chamber passes off with the sheet of water. The water and residue from the flame overflowing from the trough flows over the plates, and so much as is not deposited on the plates passes out through a hole, s, in the bottom of the chamber and into the box X, from which the water overflows, leaving the refuse to be reworked, if thought necessary. In case any of the ore is sufficiently fine when blown into the chamber D, it will be carried directly into the chamber L by the tube T and be deposited in the water falling over the plate K.

The prior processes above referred to are for the sole purpose of desulphurizing the ores, either to get rid of the sulphur or to collect it. In either case they are intended to be used merely with those ores which contain more or less sulphur, whereas my process is equally useful whether the ores to be worked contain sulphur or not.

The process as given above is the best known to me for the purpose intended, and the apparatus described is the best known to me for carrying it out; but it is evident that in certain cases (as, for example, in sand or placer mining) the ore will require but one crushing (if any) before being thrown upon the plate K, in which case one of the mills, &c., may be dispensed with.

The heating of the amalgamating-chamber is desirable, but not necessary, as the water and residue from the furnaces can be heated with steam as they enter trough N. When receiving the product from the furnaces, however, the water should be cold, to chill each particle thoroughly.

I am aware that ore has been roasted by passing through flames, and has then been received in a water-tank; but such a process differs from mine in that the water is not in rapid motion, so as to insure the reception of every particle of the hot ore in a cold bath. Moreover, whenever this prior process has been used, so far as I know, it has been practiced in a large tower, in which the weight of the ore was mainly relied upon to carry it down into the water-tank. The ore, however, becoming warm and sticky, was apt to cling to the sides of the tower, and the tower consequently required constant clearing. I am also aware that ore has been heated slowly in a furnace or by passing in close proximity to the flue of a chimney, and then being dropped into a stream of water. In either case the ore becomes sticky and tends rather to cake and clog the passage than to become brittle and snap into pieces, as it will do if it be brought while cold into sudden proximity to a hot flame and be suddenly chilled when hot. I am also aware that cold ore mixed with quicksilver has been drawn up into a water-pipe, from which it and the water are discharged into amalgamating-plates. My invention differs from all these, and consists mainly in passing the ore at its natural temperature through a comparatively small pipe, in which it will be always under the control of the air-blast which supplies the motive power, and through hot flames, which are projected into this tube, so that each particle of ore will be surrounded by the flames, and being in rapid motion will be thrown into a rapidly-moving sheet of cold water, which will chill it suddenly for the purpose of releasing all the metals.

What I claim as my invention is—

1. That improvement in the art of comminuting ore which consists in blowing the ore while cold into and through an intensely-hot flame, whereby the ore is suddenly heated to a high degree of temperature, then submitting it while still heated to the action of a roller-mill, then heating it suddenly a second time and collecting the residue while still hot in a sheet of cold water, whereby said residue shall be chilled and carried to a suitable place of deposit, all as set forth.

2. That improvement in the art of separating metals from their ores which consists in blowing the ore while cold into and through an intensely-hot flame, whereby the ore shall be suddenly heated to a high degree of temperature, then submitting it while still heated to the action of a roller-mill, whereby the ore shall be crushed and the metal polished, heating it suddenly a second time and collecting the residue while still hot in a sheet of water, and passing said sheet of water containing said residue over amalgamating-plates, all as set forth.

3. In an ore-separating apparatus, in combination with means whereby the pulverized ore may be fed to the blast, a blower, a tube to convey said pulverized ore to a roller-mill, and means whereby it may be exposed to the direct action of a flame in transit, a roller-mill located to receive the roasted ore, and means for collecting the same after it has been rolled, all substantially as and for the purposes set forth.

4. In combination with an ore-burning apparatus consisting of a furnace-tube, G, at one end of which is the fan F, and which is provided with one or more furnaces of the kind described, the slanting plate K, located in front of and near to the mouth of said ore-burning apparatus, a water-supply pipe, J, provided with holes whereby water can be spread upon said plate in front of said mouth, and a suitable depository of the kind described, whereby the contents of said plate may be collected, all substantially as described.

5. In combination with an ore-comminuting apparatus of substantially the kind described, the water-covered slanting plate K and its water-supply, the trough N, of a length equal to the width of the plate K, and shaped in the form of three-fourths of a cylinder closed at each end, and the overflow-trough P, of greater length, the trough N, located to receive the contents of the nearly-vertical plate K, and the trough P, located to receive the overflow from the trough N, substantially as and for the purposes described.

6. In an ore-reducing mechanism, the combination of a grinding-mill, a furnace-tube provided with one or more furnaces, whereby the dust from said mill will be suddenly heated by an intense heat and conveyed away, a suitable fan of the kind described connected with said tube, whereby the said dust will be forced through said tube, means for supplying a sheet of water so located as to receive the heated contents of said tube, and a suitable depository of the kind described for the dust and water, all as set forth.

7. In an ore-reducing mechanism, the combination of a grinding-mill, a furnace-tube located to convey the ground material therefrom, a crushing-mill located at the mouth of the said tube, a second furnace-tube located to convey the crushed material from said crushing-mill, said tubes being provided with one or more furnaces, substantially as described, blower-fans located to force the product of said mills through their respective tubes, means for supplying a stream of water so located as to receive the contents of said second tube, and a depository, substantially as described, for said dust and water, all as set forth.

8. The amalgamating-chamber above described, consisting of a series of plates, one below the other, slanting in opposite directions, the higher end of each plate overlapping the lower end of the plate above it, said chamber being provided with a series of steam-jets located so as to fill said chamber with steam, substantially as and for the purposes described.

In testimony whereof I have hereunto subscribed my name this 26th day of August, A. D. 1886.

SAMUEL H. COCHRAN.

Witnesses:
 GEO. O. G. COALE,
 JAS. F. BLIGH.